United States Patent [19]

Levine

[11] 4,253,120
[45] Feb. 24, 1981

[54] DEFECT DETECTION MEANS FOR CHARGE TRANSFER IMAGERS

[75] Inventor: Peter A. Levine, Trenton, N.J.

[73] Assignee: RCA Corporation, New York, N.Y.

[21] Appl. No.: 100,452

[22] Filed: Dec. 5, 1979

[51] Int. Cl.³ .................. H04N 3/14; H04N 5/34
[52] U.S. Cl. .................... 358/213; 358/163; 358/225
[58] Field of Search ............. 358/213, 163, 212, 225, 358/294

[56] References Cited

U.S. PATENT DOCUMENTS

| | | | |
|---|---|---|---|
| 3,904,818 | 9/1975 | Kovac | 358/213 |
| 4,032,976 | 6/1977 | Levine | 358/213 |
| 4,189,751 | 2/1980 | Nagumi | 358/213 |

Primary Examiner—John C. Martin
Attorney, Agent, or Firm—Samuel Cohen; George J. Seligeohn

[57] ABSTRACT

Real time detection of defective picture sampling elements of a high resolution imager may be achieved by (1) imaging a scene by means of low resoluting power imaging optics to produce an image resolution limit spot size on the imager which is large relative to the center-to-center pitch distance of the picture sampling elements, and (2) indicating as spurious each single picture sample of the serial output from the imager that exhibits certain discriminating contrast characteristics with respect to its neighboring picture samples. This permits a spurious sample to be corrected by replacement with an interpolated value derived from its neighboring samples.

7 Claims, 10 Drawing Figures

DEFECT DETECTION MEANS FOR CHARGE TRANSFER IMAGERS

This invention relates to charge transfer imagers and, more particularly, to defect detection means for such imagers.

The term "charge transfer imager", as used herein, is meant to be generic to bucket-brigade imagers, charge injection device (CID) imagers and charge-coupled device (CCD) imagers. Charge transfer imager, fabricated by large-scale integrated circuit techniques and comprised of a large number of discrete elements, are suitable for use as the photoelectric image detector of solid-state television cameras.

Defects in charge-transfer imagers of television cameras, unless corrected, result in observable light spots and lines (or in some cases dark spots and lines) in the displayed image derived from such a camera. If defect-free charge transfer images could be produced with high yield, the cost of such an imager and, hence, the cost of a solid-state television camera could be appreciably reduced. This would make television cameras available as a relatively low-priced product to consumers. However, at the present time, the manufacturing yield of defect-free charge transfer imagers (i.e., every one of an imager's large number of discrete elements is perfect) is relatively low. This greatly increases the effective cost of each defect-free imager produced.

One way of effectively increasing the yield of imagers is to substitute a corrected signal component for that produced by any individual defective element of an imager. However, before such a correction can take place, it is necessary to detect those elements of the imager which are defective.

One proposed solution to this problem involves (1) anaylzing the output signal from an imager, in the absence of an image, to detect the location of each then-existing defective element, (2) permanently storing the location of each defective element in a memory which is associated with the imager, and (3) during subsequent use of the imager, substituting a corrected signal for the signal produced by each detective element as determined by its location stored in the memory. This proposed solution may be impractical because many defects are dependent on set-up voltages and, further, are temperature dependent. Therefore, defective elements present during subsequent use of the imager may not have been present at the time of analysis and storage of the location of defective elements in the memory. In any case, the requirement for a memory associated with the imager increases the cost of a solid-state television camera employing this proposed solution to the problem of detective imager elements. The present invention is directed to a low-cost solution to this problem, which is capable of real-time detection of spurious signals produced by defective elements of an imager during actual use of the solid-state television camera employing that imager.

More specifically, in accordance with the principles of the present invention, imaging optics having a relatively low resoloving power are used to image a scene on a spatial array of discrete picture sampling element of a charge transfer imager, which sampling elements are disposed at a given center-to-center pitch distance. The low resolving power of the imaging optics is such that the image on the array has a given image resolution limit spot size, which spot size is larger than the aforesaid pitch distance. Therefore, the highest spatial-frequency component of the imager illuminates at least two picture sampling elements. However, as is brought out in more detail below, defects have well defined characteristics that permit them to be distinguished from a valid image on the array. The imager, in response to applied clock voltages, derives a serial output signal comprised of successive picture samples obtained from the picture elements at a clock rate of the clock voltages. This serial output signal is then processed by signal processing means that includes defect detection means for indicating as spurious each single picture sample of a serial output signal that exhibits certain contrast characteristics with respect to its neighboring picture samples.

For illustrative purposes, the present invention is described employing a CCD imager of the field transfer type. However, it should be understood that the present invention encompasses all types of charge transfer imagers.

In the drawings:

FIG. 1 is a block diagram of a solid-state television camera incorporating a high resolution charge transfer imager;

FIG. 2 schematically illustrates the charge transfer imager of FIG. 1, assuming the imager to be a CCD of the field transfer type;

Figure 1:
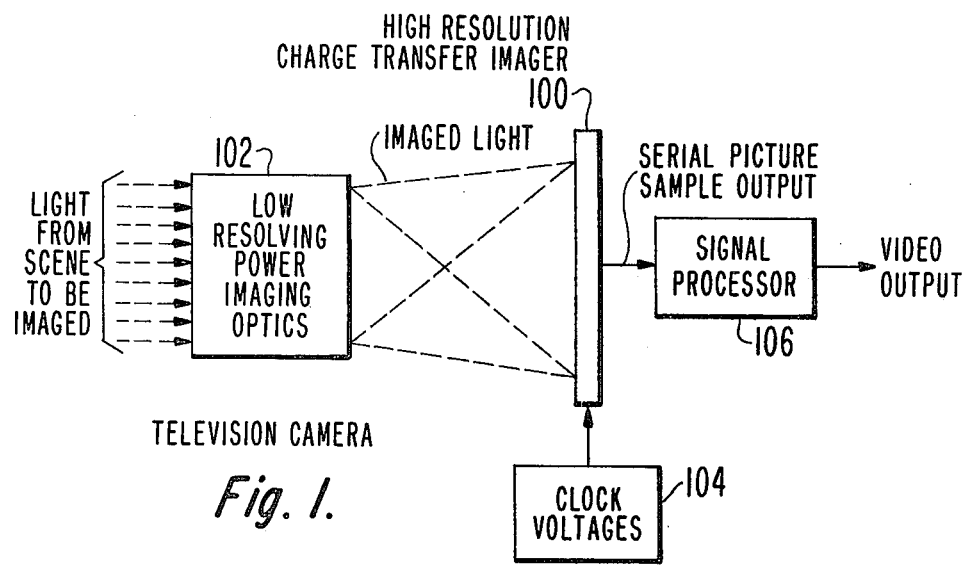

Referring to FIG. 1, light from a scene to be imaged is imaged on the photosensitive surface of high resolution charge transfer imager 100 by low resolving power imaging optics 102. As is known in the optics art, the resolving power of an optical element, such as a lens, is proportional to the numerical aperture of the optical element. A lens having a high ratio of physical apertue size to focal length has a higher resolving power than a lens having a low ratio of physical aperture size to focal length. As is also known in optics, the resolving power of an imaging optical element determines the image resolution limit size in the image plane of the element. Stated another way, an imaging optical element operates as a low-pass spatial frequency filter having a cutoff frequency that increases as the resolving power of the element increases. In practice, imaging optics 102 may be composed of a combination of optical elements, which optical elements may include lenses, mirrors, lenticular arrays and/or aperture plates, by way of example. By a suitable choice of these optical elements, the numerical aperture, resolving power and spatial frequency filtering characteristics of imaging optics 102 may be selected. In accordance with the principles of the present invention, the resolution capability of imager 100 is substantially higher than the image resolution limit of imaging optics 102.

Imager 100, in response to clock voltages applied thereto from clock voltage source 104, derives a serial picture-sample output of the image projected on the surface of imager 100. This serial output occurs at a rate corresponding to a clock rate of clock voltages 104. The serial picture sample output of imager 100 is processed electronically by signal processor 106 to derive a television camera video output.

Figure 2:
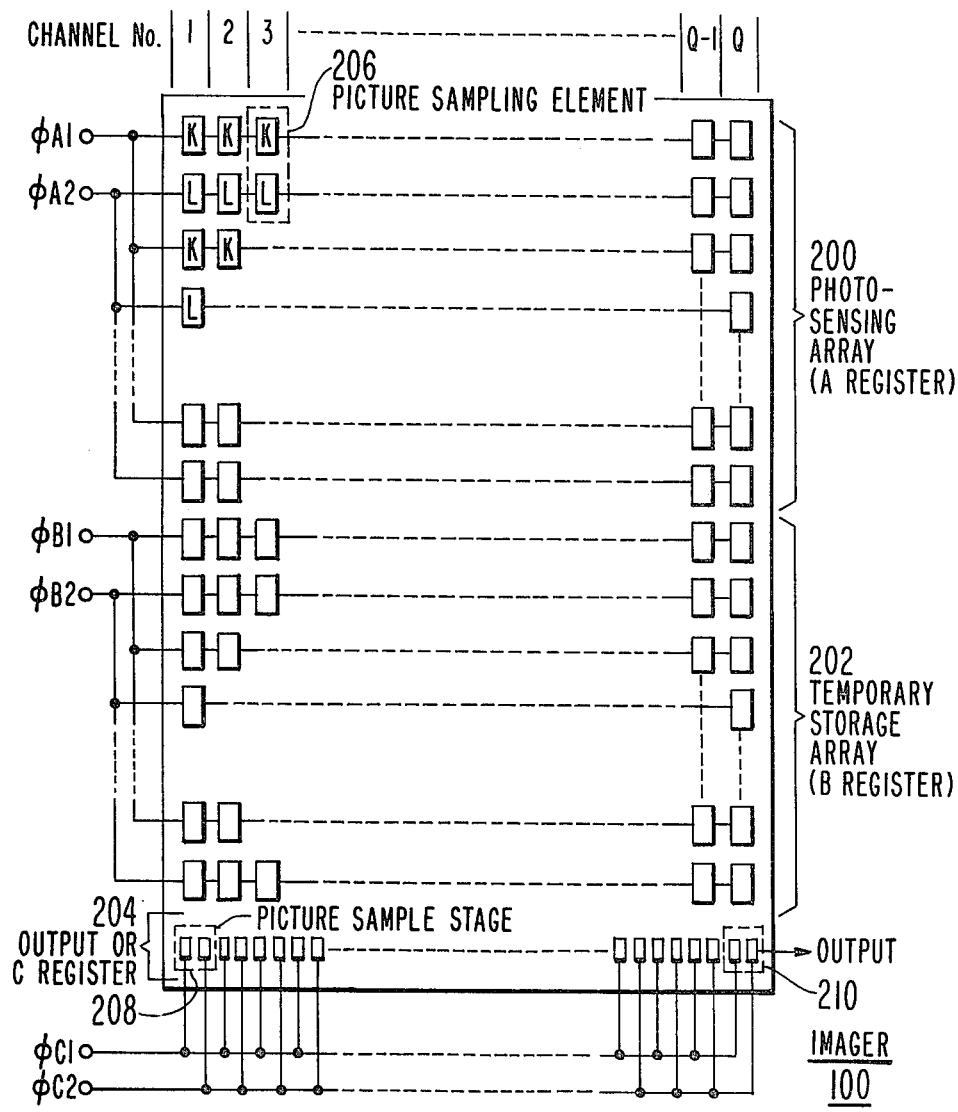

Referring to FIG. 2, it is assumed that imager 100 is a CCD imager of the field transfer type (sometimes termed an imager of the "frame" transfer type). Such CCD imagers are known in the art, and by way of example, are described in some detail in my U.S. Pat. No. 4,032,976, which issued June 28, 1977. FIG. 2 illustrates a two-phase CCD imager, including a photosensing array 200, known as an A register, a temporary storage array 202, known as a B register, and an output register 204, known as a C register. The B and C registers are masked: that is, means are provided for preventing a radiant energy image from reaching either register B or C.

The A and B registers are divided into Q separate channels, numbered 1 . . . Q, each extending in the column direction. Extending in the column direction, between each pair of adjacent channels, is a channel stop (shown in FIG. 3, discussed below) for isolating charges in adjacent channels from each other. Each pair of adjacent electrodes K and L of each respective channel defines a discrete picture sampling element (shown as a dashed rectangle 206). The electrodes K and L, per discrete picture sampling element, constitute two-phase structures for ensuring unidirectional signal propagation in response to applied clock voltages from the source of clock voltages 104 (FIG. 1).

In particular, during the occurrence of each successive television field period, each picture sampling element 206 of photo-sensing array 200 accumulates a charge proportional to the total illumination exposure thereof during that field period. At the end of each field period (during the vertical blanking interval of commercial television), the charge signals which have accumulated are transferred, in parallel, in the column direction from the A register to the B register by the application of the multiple phase clock voltages $\phi_{A1}$, $\phi_{A2}$, $\phi_{B1}$, $\phi_{B2}$. During the occurrence of the next field (in particular, during each successive horizontal line blanking interval of commercial television) clock phase voltages $\phi_{B1}$ and $\phi_{B2}$ are operated to transfer a line of picture samples at a time from the B register to the C register. (Dashed rectangular boxes 208 and 210 indicate stages of the C register, each of which stores a picture sample). During each successive television horizontal line time, the respective picture samples then stored in the C register are transferred sequentially out of the C register to form the serial picture-sample output from imager 100. The transfer out of the C register usually occurs at the highest clock rate, namely, the clock rate of clock phase voltages $\phi_{C1}$ and $\phi_{C2}$, applied to the C register from the source of clock voltages 104 (FIG. 1). Therefore, normally the serial output of picture samples also occurs at this clock rate.

Figure 3:
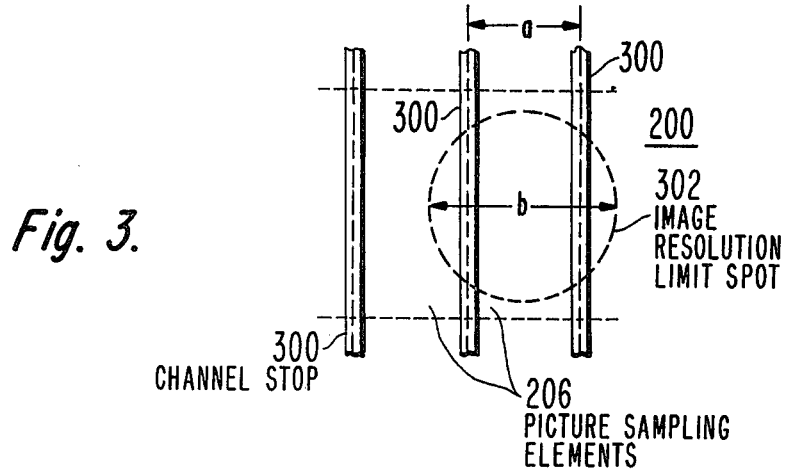
FIG. 3 is a detailed drawing of a fragment of the imager of FIG. 2, showing the spatial relationship between an image resolution limit spot and neighboring picture sampling elements.

Referring to FIG. 3, there is shown the spatial relationship between the picture sampling elements of photo-sensing array 200 (the A register) and the image resolution limit spot size illuminating these picture sampling elements. As shown, picture sampling elements 206 of adjacent channels of array 200 are isolated from each other by channel stops 300, and are spaced from each other at a center-to-center pitch distance of a. Therefore, the charge signal due to a defect contained in one channel generally does not extend across the intervening channel stop to the picture sampling element of an adjacent channel.

The center-to-center pitch distance a is relatively small, thereby providing photo-sensing array 200 with a high resolution capability. However, due to the relatively low resolving power of imaging optics 102, image resolution limit spot 302 has a size b which is substantially greater than a. Therefore, the highest valid spatial frequency component of an image illuminating array 200 must necessarily extend over at least two picture sampling elements. However, due to the isolation of adjacent picture sampling elements by channel stops 300, a defect in a picture sampling element normally involves only a single one of two adjacent channels. This provides a discriminant that can be used in the examination of the serial picture sample output from imager 100 to distinguish any picture sample derived from a defective element from a picture sample forming part of a valid image output.

Returning to FIG. 2, any picture sample generated by any particular picture sampling element 206 of any particular channel of the A register is transferred through all the picture sampling elements of that channel of both the A and B registers situated below that particular picture sampling element, and then is further transferred through picture sampling stages of the C register, before it appears as a picture sample in the output from imager 10. Since a defect in any element of a particular channel of the A or B register is confined to that channel, the effect of such a defect appears in the display produced from the imager as: a spot (for a non-blooming defect in the A register); as a vertical-line blemish (extending down from the position of a defective element in the B register); or as a bright vertical line with its center at the defect location, but still occupying only one channel, for a defect in the A register which generates sufficient charge to cause blooming. The present invention is capable of removing from the display such point and vertical line blemishes, due to defects in the elements of the A and B registers.

Figure 4:
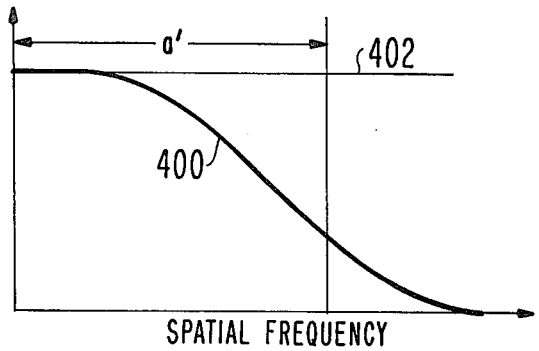
FIG. 4 illustrates a typical spatial frequency characteristic of the imaging optics of FIG. 1.

Referring to FIG. 4, there is shown a graph of a typical high spatial frequency roll-off characteristic of an image produced on the surface of imager 100 by low resolving power imaging optics 102. The spatial frequency a', in FIG. 4, corresponds to a spatial wavelength equal to the center-to-center pitch distance a between adjacent picture sampling elements 206, in FIG. 3. As shown in FIG. 4, the high spatial frequency response 400 of the image on imager 100 starts to roll-off from a flat response 402 at a spatial frequency substantially lower than a' and is down many db at the spatial frequency a'. The spatial frequency roll-off response curve 400 is uniquely determined by the spatial filter characteristics of low resolving power imaging optics 102. In any individual case, response curve 400 may be ascertained by measurement and/or calculation. As is described in more detail below, knowing response curve 400 for imaging optics 102 permits later compensation for the high frequency roll-off by an electronic high-frequency peaking circuit in signal processor 106 that exhibits a high-frequency response that is the complement of response curve 400.

Figure 5:
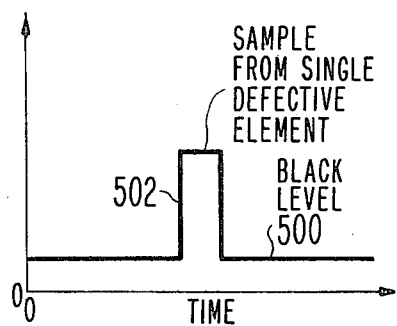
FIG. 5 illustrates the amplitude response of a picture sample produced by a single defective picture element, when the imager is situated in the dark.

Referring to FIG. 5, black level 500 is the amplitude of picture samples derived from non-defective elements of imager 100, when imager 100 is maintained in the dark. Black level 500 (which is due to normal dark current charge) is relatively low. However, as indicated by single picture sample 502, the picture sample amplitude of an element suffering from one type of defect is quite large. More specifically, this type of defect involves the intrinsic accumulation of substantial charge by a picture sampling element in the absence of illumination thereof. It is this type of defect (shown in both FIGS. 5 and 7) that is being used for illustrative purposes in describing the present invention. However, it should be understood that the invention also applies to the detection of other types of defects in which the amplitude from a detective element is below that of the black level. In either case, in the dark, sample 502 from a single defective element exhibits a relatively high contrast with respect to its neighboring picture samples.

Figure 6:
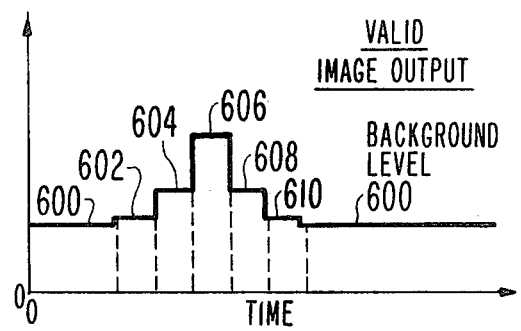
FIG. 6 illustrates the amplitude response of a group of neighboring picture samples derived from defect-free elements, which constitute an example of a valid image output for a point source of illumination.

FIG. 6 illustrates a group of neighboring picture samples that constitute a relatively high spatial frequency component, superimposed on a certain background level of illumination, of a valid image output. Specifically, the amplitude of background level 600 is determined by the dc or relatively low frequency portions of the illuminating light forming the group of five neighboring picture samples 602, 604, 606, 608 and 610. The envelope of this group of five picture samples 602–610 defines a relatively high spatial frequency component of the image. Although this high spatial frequency component of the image is shown as symmetrical in FIG. 6, it could be asymmetrical.

Due to the fact that the image resolution limit size is substantially greater than the center-to-center pitch distance of a picture sampling element, the envelope defined by the group of picture samples 602–610, for a valid image output, cannot define a spatial frequency as high as that defined by a single picture element by itself (such as shown in FIG. 5). In other words, the contrast between adjacent picture samples 602–610 (with respect to each other and with respect to background level 600) is much less abrupt than the contrast between single picture sample 502 from a defective element and black level 500 in FIG. 5.

Figure 7:
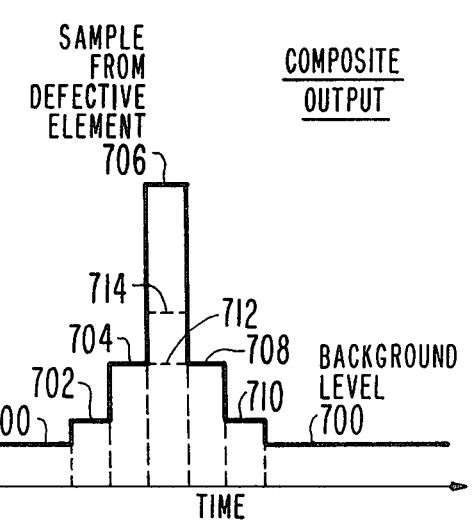
FIG. 7 illustrates the amplitude response of a group of neighboring picture elements including one defective element, which constitutes an example of the composite of output obtained from an image, such as that shown in FIG. 6, and a defective-element, such as that shown in FIG. 5.

Referring to FIG. 7, there is shown a composite of a valid image output with that of a defective single element. Specifically, background level 700 of FIG. 7 corresponds with background level 600 of FIG. 6, and the respective picture samples 702, 704, 708 and 710 of the group of five neighboring picture samples 702–710 of FIG. 7 correspond respectively with picture sample 602, 604, 608 and 610 of FIG. 6. However, picture samples 706 of the group of five neighboring picture samples 702–710 is derived from a defective element. For this reason, the amplitude of picture sample 706 of FIG. 7 is shown significantly greater than the corresponding amplitude 606 of a valid image output of FIG. 6. It can be seen that the envelope defined by background level 700 and picture samples 702–710 of FIG. 7 can be distinguished from the envelope defined by background level 600 and valid image output picture samples 602–610 by differences in the contrast characteristics among the respective groups of neighboring picture samples. Therefore, a picture sample from a defective element, such as picture sample 706, may be detected and then replaced by a substituted correct picture sample having an amplitude 712 or 714 that is derived by interpolation from the respective amplitudes of all or some of neighboring picture samples 702, 704, 708 and 710.

Figure 10:
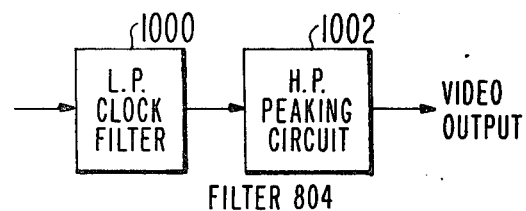
FIG. 10 illustrates a preferred embodiment of the filter of FIG. 8.
Figure 8:
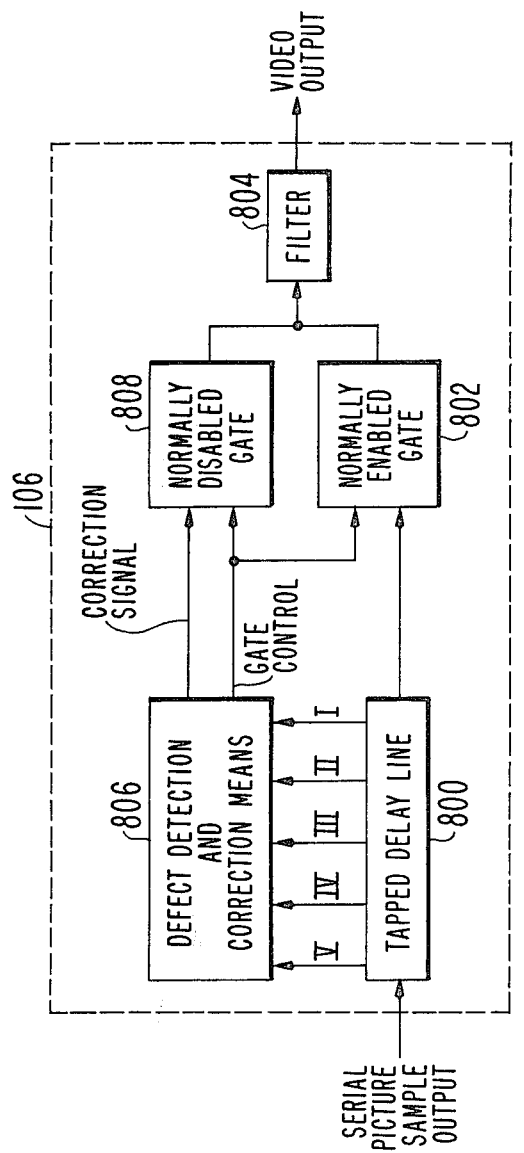
FIG. 8 is a block diagram of an embodiment of the signal processing means of FIG. 1 incorporating the present invention.
Figure 9:
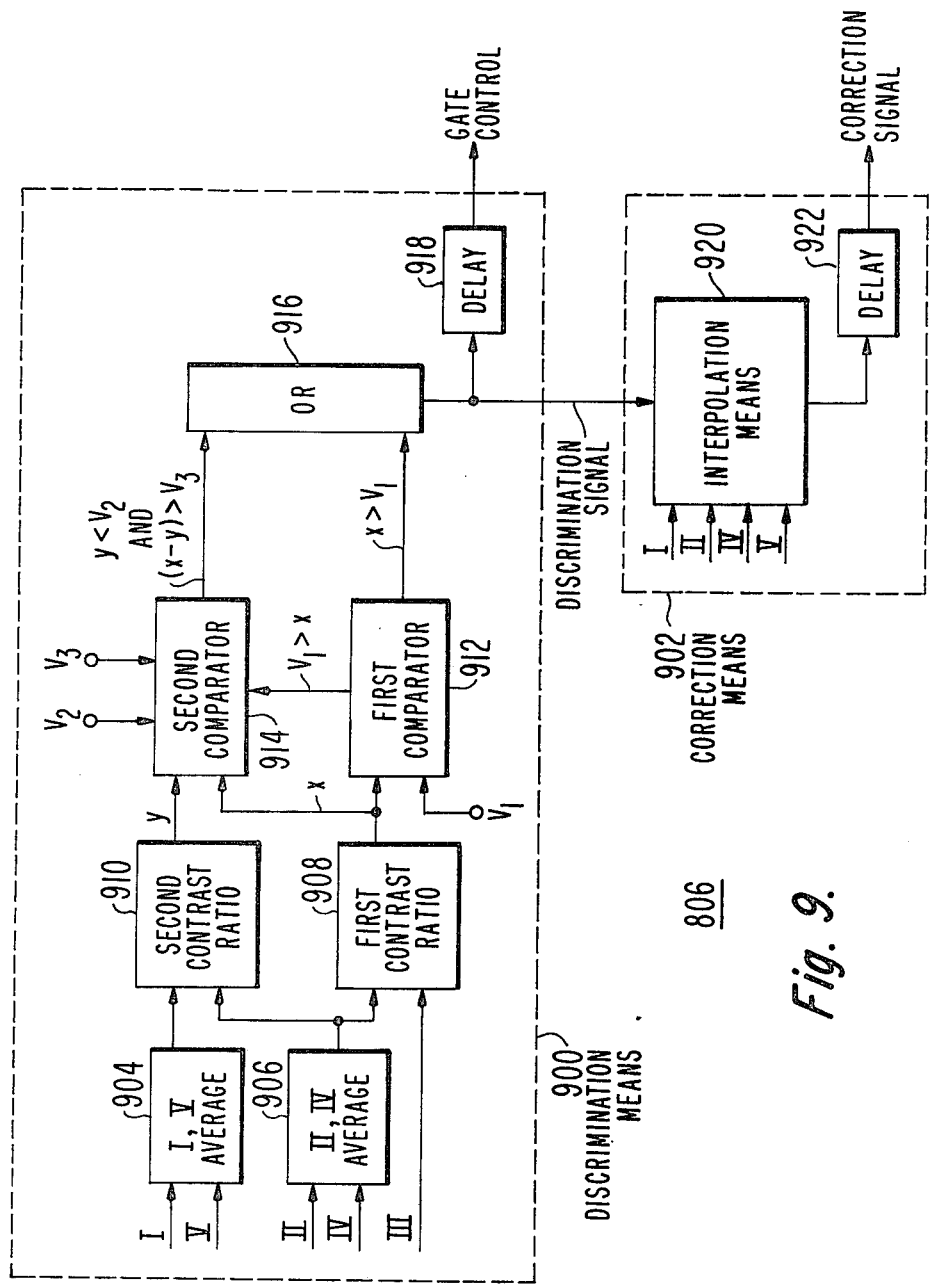
FIG. 9 illustrates a preferred embodiment of discrimination means and correction means forming the defect detection and correction means of FIG. 8.

FIGS. 8, 9 and 10 show a preferred embodiment of circuitry for detecting and correcting in real time picture samples derived from defective picture sampling elements of the imager.

Referring to FIG. 8, signal processor 106 may comprise tapped delay line 800 having the serial picture sample output from imager 100 applied as an input thereto. Normally, the serial picture sample output from imager 100, after passing through the entire length of tapped delay line 800 and normally enabled gate 802, is applied as an input to filter 804. Filter 804 includes a low pass filter for integrating the picture sample clock frequency. For instance, if the picture sample clock frequency is in the order of 6 MHz, the cut off frequency of the low pass filter may be only in the order of 3 MHz. In this manner, a smooth video output signal is derived from signal processor 106.

Tapped delay line 800 further includes a predetermined plural number of taps, such as five taps, each spaced one picture-sample stage from the adjacent tap. This permits tapped delay line 800 to operate as a serial-to-parallel converter for converting each running group of five neighboring picture samples, of the serial picture sample output, into parallel form at the five taps. Each of the five taps of tapped delay line 800, which are numbered I, II, III, IV and V, is coupled to a separate input of defect detection and correction means 806. A preferred embodiment of defect detection and correction means 806 is shown in FIG. 9, discussed below.

In any case, defect detection and correction means 806 determines whether the then-applied picture sample from tap III is spurious, in accordance with its contrast characteristics with respect to its neighboring picture samples from taps I, II, IV and V. In response to the detection of a spurious picture sample, a gate control signal is applied to normally enabled gate 802 and normally disabled gate 808 after a delay substantially equal to the time required for the spurious sample to reach the end of tapped delay line 800 and be applied to normally enabled gate 802 (the delay means may be within block 806). Further, defect detection and correction means 806 derives, by interpolation of the values of the neighboring picture samples then applied from taps I, II, IV and V, a correction signal for the spurious picture sample. After a delay that is also substantially equal to the time for the spurious sample to reach the end of tapped delay line 800 and be applied to normally enabled gate 802, the correction signal is applied to normally disabled gate 808. Since the respective outputs of gates 802 and 808 are connected in common to the input of filter 804, the opening of normally disabled gate 808 by the gate control input applied thereto, results in the substitution of the correction signal for the spurious picture sample. In this manner, spurious picture samples derived from defective picture sampling elements do not appear in the video output from filter 804.

Referring to FIG. 9, there is shown a preferred embodiment of defect detection and correction means 806.

As shown in FIG. 9, means 806 is comprised of discrimination means 900 for deriving the aforesaid gate control signal and correction means 902 for deriving the aforesaid correction signal. Discrimination means 900 includes an analog circuit 904 for producing an output having a value corresponding to the average of the respective values of the neighboring picture samples then being derived from taps I and V of tapped delay line 800. Similarly, analog circuit 906 derives an output corresponding to the average of respective values of the neighboring picture samples then being applied to taps II and IV of tapped delay line 800. The picture sample applied to tap III of tapped delay line 800 is applied as a first input to first contrast ratio circuit 908 and the output of circuit 906 is applied as a second input to first contrast ratio 908. Further, the output of circuit 906 is applied as a first input to second contrast ratio circuit 910 and the output of circuit 904 is applied as a second input to second contrast ratio circuit 910.

The output from first contrast ratio circuit 908, designated x, is applied as a signal input to first comparator 912 and a predetermined voltage $V_1$ is applied as a reference input to first comparator 912. Further, the output x from first contrast ratio circuit 908 is also applied as a first signal input to second comparator 914 and the output of second contrast ratio circuit 910, designated y, is applied as a second signal input to second comparator 914. In addition, a predetermined voltage $V_2$ is applied as a first reference input to second comparator 914 and a predetermined voltage $V_3$ is applied as a second reference input to second comparator 914. First comparator 912 applies a first input to OR gate 916 only in response to the value x of the signal input thereto exceeding the value $V_1$ of the reference input thereto. Otherwise, first comparator 912 applies an enable signal input to second comparator 914 in response to the value $V_1$ of reference input to first comparator 914 exceeding value x of the signal input thereto. If enabled, second comparator 914 applies a second input to OR gate 916 whenever both the value of the y signal input thereto is less than the $V_2$ reference input thereto and the difference between the x and y signal inputs thereto is greater than the $V_3$ reference input thereto. In response to either a first or second input thereto, OR gate 916 produces a discrimination signal output therefrom. This discrimination signal output is applied through a suitable delay 918, discussed above, as the gate control output of defect detection and correction means 806.

In addition, the discrimination signal is applied as an enabling input to interpolation means 920 of correction means 902. Interpolation means 920 has applied thereto, as respective inputs, the enabling picture samples then applied to taps I, II, IV and V of tapped delay line 800. When enabled by a discrimination signal applied thereto, interpolation means 920 derives an interpolated value of the correction signal to be substituted for the spurious picture sample then at tap III of tapped delay line 800. The output of interpolation means 920, after passing through delay 922 discussed above, forms the correction signal output of defect detection and correction means 806.

The manner of operation of the preferred embodiment of defect detection and correction means 806, shown in FIG. 9, will now be discussed in connection with FIG. 7. In this discussion, input III corresponds to the sample from defective element 706, and inputs I, II, IV and V correspond with respective neighboring picture samples 702, 704, 708 and 710. The value x of the first contrast ratio is indicative of the ratio of the amplitude of picture sample 706 to the average of the amplitudes of neighboring picture samples 704 and 708. A spurious picture sample 706 is indicated by the value x of this contrast ratio being larger than a given value (determined by reference input $V_1$). Thus an output from first comparator 912 constitutes a first discriminating criteron indicating picture sample 706 to be spurious However, in the case where background level 700 is relatively high, it is possible for the ratio of the amplitude of picture sample 706 to the average amplitude of neighboring picture sample 704 and 708 to be relatively small, even though picture sample 706 is spurious. Therefore, in this case, a more sophisticated discriminating criteron must be used to determine whether picture sample 706 is part of a valid image output or whether it is spurious. If background level 700 is high and the image output were valid, the ratio of the average amplitudes of picture samples 704 and 708 to the average amplitudes of picture samples 702 and 710 (the second contrast ratio y) would be small (i.e., less than reference input $V_2$) and the ratio of the amplitude of picture sample 706 to the average of picture samples 704 and 708 (first contrast ratio x) would only slightly exceed the second contrast ratio y (i.e., be less than reference input $V_3$) to provide a smooth envelope for the five neighboring pictures samples (as shown in FIG. 6).

At a high background level 700, the second contrast ratio y is still relatively low for a spurious picture sample 706, since the second contrast ratio does not involve the amplitude of picture sample 706. However, in the case of a spurious sample 706, the difference between the first contrast ratio x and the second contrast ratio y is relatively large (greater than the reference input $V_3$), because the presence of spurious sample 706 results in a sharp protuberance in the envelope of the composite of an image output containing spurious picture sample. Therefore, an output from second comparator 914 also comprises a discriminating criterion indicative of a spurious picture sample. More than five neighboring samples could be used to provide an even more sophisticated discriminating criterion for a spurious picture sample. Further, by employing first and second contrast ratios which are the reciprocals of x and y (i.e., 1/x and 1/y,), dark spots and lines caused by defective elements can be detected.

Interpolation means 920 merely may insert, as a correction signal, an amplitude 712 equal to the average of the amplitudes of neighboring picture samples 704 and 708. However, preferably, interpolation means 912 inserts a correction signal amplitude 714 that is derived as a function of the difference in the average amplitudes of neighboring picture sample 702 and 710 and the average of the amplitudes of neighboring picture sample 704 and 708, to generate a smooth envelope approximating that of a valid image output.

Tapped delay line 800 and the circuits of the preferred embodiment of defect detection and correction means 806 shown in FIG. 9 are analog in nature. However, as is known in the art, digital techniques may be substituted for analog techniques. For instance, an analog-to-digital converter for expressing the amplitude of each serial picture sample as a parallel multi-bit byte, together with a corresponding parallel group of suitable shift registers, can be substituted for tapped delay line 800. Further, the respective functions performed by circuits 904, 906, 908, 910, 912 and 914 can all be performed digitally. Delays 918 and 922 can be achieved using shift registers. Interpolation means 920 can employ a look-up table, such as a read-only memory (ROM), for determining the digital value of the correction signal in accordance with the respective digital value of inputs I, II, IV and V, applied as a digital address. This digital value of the correction signal could then be changed back to analog form by a digital-to-analog converter.

Furthermore, the techniques employed in FIG. 9 for indicating the spurious picture sample in accordance with its contrast characteristics with respect to its neighboring picture samples, are not the only techniques that may be utilized for this purpose. For instance, all the respective picture samples inherently have very sharp edges (as shown in FIGS. 5, 6 and 7), and the edges of a spurious picture sample are substantially longer than the respective edges of valid picture samples. Therefore, contrast discrimination may be achieved by differentiating the serial picture sample output and indicating as spurious any picture sample that produces a differentiated amplitude having an absolute value greater than a predetermined threshold. Thus, the present invention is intended to cover any and all techniques for indicating as spurious every single picture sample of the serial output signal that exhibits certain discriminating contrast characteristics with respect to its neighboring picture samples.

Referring to FIG. 10, there is shown an embodiment of filter 804 which includes both low pass clock filter 1000 (for integrating the sample clock frequency in the manner described above) and high frequency peaking circuit 1002 for compensating for the low resolving power of imaging optics 102. High frequency peaking circuit 1002 exhibits characteristics which are the complement of the high spatial frequency roll off of imaging optics 102 (such as shown in FIG. 4). The presence of peaking circuit 1002 has the advantage of increasing the crispness and imaging resolution of a picture produced by the video output from filter 804. However, the price to be paid for this advantage is a reduction in the signal-to-noise ratio of charge transfer imager 100. However, since charge transfer imagers, such as CCD imagers, exhibit very high intrinsic signal-to-noise ratio, the consequent reduction in signal-to-noise due to the presence of peaking circuit 1002 in exchange for reduced fixed pattern noise is a good tradeoff.

The defect detection system of the present invention operates best for cases in which the defect signals would be most disturbing to the viewer. That is, the best performance is obtained when the defect location occurs (a) in a region where the background is at either a steady black level or (b) in a region in which the background illumination level varies between values such that the charge signals produced are at substantially different amplitudes than is the defect charge signal. In such cases, the present system substitutes for the disturbing defect signal in the displayed picture, a signal which is compatible with the surrounding signal level, as discussed in detail above. In those cases where the defect location is in a background illuminated by strong light, or in which there are sharply varying light and dark regions, in either case such that output signals of an amplitude close to that produced by the defect location are produced adjacent to the defect location, the system described may not be able to detect the defect signal. In these cases the defect signal may be displayed; however, since it will be displayed adjacent to or in a background of displayed signals of close to the same intensity, the defect signal will not be very noticeable and, in many cases, will not even be detectable to the ordinary observer.

What is claimed is:

1. In combination
    a charge transfer imager comprised of a spatial array of discrete picture sampling elements disposed at a given center-to-center pitch distance,
    imaging optics having a relatively low resolving power adapted to image a scene on said array with a given image resolution limit spot size, which spot size is larger than said pitch distance, whereby the highest spatial-frequency component of said image illuminates at least two picture sampling elements,
    means for applying clock voltages to said imager to derive a serial output signal therefrom, said serial output signal being comprised of successive picture samples obtained from said elements at a clock rate of said clock voltages, and
    signal processing means for processing said serial output signal from said imager, said signal processing means including imager defect detection means for indicating as spurious each single picture sample of said serial output signal that exhibits certain discriminating characteristics with respect to its neighboring picture samples.

2. The combination defined in claim 1,
    wherein said defect detection means comprises discrimination means responsive to the respective values of neighboring picture samples of each successive single picture sample of said imager serial output signal for deriving a discrimination signal indicating as spurious any single picture sample having an actual value which falls outside of a range of probable interpolated values for that single picture sample, which range is determined from said respective values of neighboring picture samples to that single picture sample.

3. The combination defined in claim 2,
    wherein said discrimination means derives said discrimination signal in response to the contrast ratio of said actual value of that single picture sample to the average of the respective values of its adjacent picture samples on either side thereof differing from unity by more than a specified amount in at least one of positive and negative directions.

4. The combination defined in claim 3,
    wherein said discrimination signal is derived in response to said contrast ratio differing from unity in the positive direction by a first specified amount and in the negative direction by a second specified amount.

5. The combination defined in claim 3, wherein said discrimination means also derives said discrimination signal in the concurrence of (1) response to a second contrast ratio of the average of said adjacent picture samples to the average of the neighboring picture samples next to said adjacent picture samples differing from unity by less than a first particular absolute value and (2) said first-mentioned contrast ratio differing from said second contrast ratio in at least one of said positive and negative directions by more than a second particular value.

6. The combination defined in claim 2,
    wherein said defect signal processing means comprises defect correction means responsive to said discrimination signal for substituting, for the actual value of any spurious single picture sample in said serial output, a substantially correct-value picture sample derived by interpolation from at least some of the respective values of said neighboring picture samples to that single picture sample.

7. The combination defined in claim 6,
wherein said imaging optics constitutes a low-pass spatial frequency filter having a predetermined high spatial frequency roll-off characteristic, and
wherein said signal processing means comprises filter means for deriving a video output signal from the picture samples of said imager serial output signal after correction by said defect correction means, filter means including a peaking circuit having a high-frequency characteristic which substantially corresponds to the complement of said high spatial frequency roll-off characteristic for effectively restoring in said video output signal the loss in image resolution produced by said low-pass spatial filter.

* * * * *